United States Patent
Miyashita et al.

(10) Patent No.: US 9,632,528 B2
(45) Date of Patent: Apr. 25, 2017

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Ken Miyashita, Tokyo (JP); Kiyoshi Yoshikawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 14/533,436

(22) Filed: Nov. 5, 2014

(65) Prior Publication Data
US 2015/0134998 A1 May 14, 2015

(30) Foreign Application Priority Data
Nov. 14, 2013 (JP) ................. 2013-235884

(51) Int. Cl.
G06F 1/12 (2006.01)
G06F 1/06 (2006.01)
G06F 3/06 (2006.01)

(52) U.S. Cl.
CPC .................. *G06F 1/12* (2013.01); *G06F 1/06* (2013.01); *G06F 3/06* (2013.01)

(58) Field of Classification Search
CPC .................. G06F 1/06; G06F 1/12; G06F 3/06
See application file for complete search history.

(56) References Cited

U.S. PATENT DOCUMENTS

| | | | | |
|---|---|---|---|---|
| 5,602,992 A | * | 2/1997 | Danneels | H04J 3/0632 370/507 |
| 6,122,673 A | * | 9/2000 | Basak | H04L 12/5602 370/412 |
| 2011/0064177 A1 | * | 3/2011 | Na | H04J 3/0664 375/356 |
| 2011/0268097 A1 | * | 11/2011 | Agrawala | G01S 5/021 370/338 |

FOREIGN PATENT DOCUMENTS

| | | | | |
|---|---|---|---|---|
| EP | 1601124 B1 | * | 1/2008 | .......... H04J 3/06 |
| JP | 2011-233063 A | | 11/2011 | |

* cited by examiner

*Primary Examiner* — Jaweed A Abbaszadeh
*Assistant Examiner* — Terrell Johnson
(74) *Attorney, Agent, or Firm* — Chip Law Group

(57) ABSTRACT

There is provided an information processing apparatus including a virtual clock controller configured to update a first virtual clock on the basis of a system clock, and a synchronization part configured to perform given data synchronization processing with another information processing apparatus on the basis of the first virtual clock and a second virtual clock that is updated by the another information processing apparatus.

12 Claims, 11 Drawing Sheets

12
INFORMATION PROCESSING APPARATUS, INFORMATION PROCESSING METHOD, AND RECORDING MEDIUM

CROSS REFERENCE TO RELATED APPLICATIONS

This application claims the benefit of Japanese Priority Patent Application JP 2013-235884 filed Nov. 14, 2013, the entire contents of which are incorporated herein by reference.

BACKGROUND

The present disclosure relates to an information processing apparatus, an information processing method, and a recording medium.

A technique has recently been known that ordering of processes executed by respective information processing apparatuses is grasped by logical clock values. Example of the technique for controlling the logical clock values includes Lamport's algorithm (for example, see JP 2011-233063A). In Lamport's algorithm, an information processing apparatus of the transmitting side transmits a message by setting, to the message, a logical clock value of the information processing apparatus of the transmitting side at the point of transmitting the message as a time stamp, and increases the logical clock value of the information processing apparatus of the transmitting side.

On the other hand, an information processing apparatus of the receiving side calculates, as a new logical clock value of the information processing apparatus of the receiving side, a value obtained by adding a given number to the larger value selected from the time stamp set to the message and the logical clock value of the information processing apparatus of the receiving side. While no message is transmitted or received, the logical clock value of the information processing apparatus of the transmitting side and the logical clock value of the information processing apparatus of the receiving side are monotonically increased alternately. According to such general Lamport's algorithm, the ordering of message transmitting/receiving can be grasped.

SUMMARY

However, according to the general Lamport's algorithm, the ordering of processes executed between transmission/reception of messages is usually not grasped. Accordingly, the accuracy of data synchronization processing between multiple information processing apparatuses may not be enhanced. In light of the foregoing, it is desirable to provide technology capable of performing data synchronization processing between multiple information processing apparatuses more accurately.

According to an embodiment of the present disclosure, there is provided an information processing apparatus including a virtual clock controller configured to update a first virtual clock on the basis of a system clock, and a synchronization part configured to perform given data synchronization processing with another information processing apparatus on the basis of the first virtual clock and a second virtual clock that is updated by the another information processing apparatus.

According to another embodiment of the present disclosure, there is provided an information processing method including updating a first virtual clock on the basis of a system clock, and performing, by a processor, given data synchronization processing with another information processing apparatus on the basis of the first virtual clock and a second virtual clock that is updated by the another information processing apparatus.

According to another embodiment of the present disclosure, there is provided a non-transitory computer-readable recording medium having a program recorded thereon, the program being for causing a computer to function as an information processing apparatus including a virtual clock controller configured to update a first virtual clock on the basis of a system clock, and a synchronization part configured to perform given data synchronization processing with another information processing apparatus on the basis of the first virtual clock and a second virtual clock that is updated by the another information processing apparatus.

According to one or more of embodiments of the present disclosure, data synchronization processing between multiple information processing apparatuses can be performed more accurately. Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
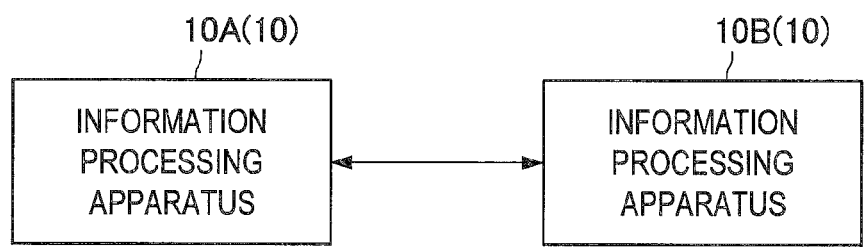
FIG. 1 is a diagram showing a configuration example of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets or numerals after the same reference numeral. Note that, in the case where it is not necessary to distinguish the multiple structural elements that have substantially the same function and structure from one another, the multiple structural elements are denoted with the same reference numeral only.

Note that the description will be given in the following order.

0. General technology
1. Configuration example of information processing system
2. Functional configuration example of information processing apparatus
3. Details of functions of information processing apparatus
4. Other configuration examples of information processing system
5. Hardware configuration example of information processing apparatus
6. Conclusion <0. General Technology>

First, general technology will be described. A technique has recently been known that ordering of processes executed by respective information processing apparatuses is grasped by logical clock values. Example of the technique for controlling the logical clock values includes Lamport's algorithm. In Lamport's algorithm, an information processing apparatus of the transmitting side transmits a message by setting, to the message, a logical clock value of the information processing apparatus of the transmitting side at the point of transmitting the message as a time stamp, and increases the logical clock value of the information processing apparatus of the transmitting side.

On the other hand, an information processing apparatus of the receiving side calculates, as a new logical clock value of the information processing apparatus of the receiving side, a value obtained by adding a given number to the larger value selected from the time stamp set to the message and the logical clock value of the information processing apparatus of the receiving side. While no message is transmitted or received, the logical clock value of the information processing apparatus of the transmitting side and the logical clock value of the information processing apparatus of the receiving side are monotonically increased alternately. According to such general Lamport's algorithm, the ordering of message transmitting/receiving can be grasped.

However, according to the general Lamport's algorithm, the ordering of processes executed between transmission/reception of messages is usually not grasped. Accordingly, the accuracy of data synchronization processing between multiple information processing apparatuses may not be enhanced. In light of the foregoing, the present specification suggests technology capable of performing data synchronization processing between multiple information processing apparatuses more accurately.

<1. Configuration Example of Information Processing System>

Subsequently, a configuration example of an information processing system 1 according to an embodiment of the present disclosure will be described. FIG. 1 is a diagram showing a configuration example of the information processing system 1 according to an embodiment of the present disclosure. Referring to FIG. 1, the information processing system 1 includes an information processing apparatus 10A and an information processing apparatus 10B. The information processing apparatus 10A and the information processing apparatus 10B are communicable with each other through a network via wire or radio. Alternatively, the information processing apparatus 10A and the information processing apparatus 10B may be communicable with each other through a leased line.

Note that, although the description below will be given of the case where the information processing apparatus 10 is adopted as a personal computer (PC), the information processing apparatus 10 may also be adopted as a device other than the PC. For example, the information processing apparatus 10 may be adopted as a smartphone, a video camera, a digital camera, a personal digital assistant (PDA), a mobile phone, a mobile music playback device, a mobile video processing device, a mobile game console, or the like.

Heretofore, a configuration example of the information processing system 1 according to an embodiment of the present disclosure has been described.

<2. Functional Configuration Example of Information Processing Apparatus>

Figure 2:
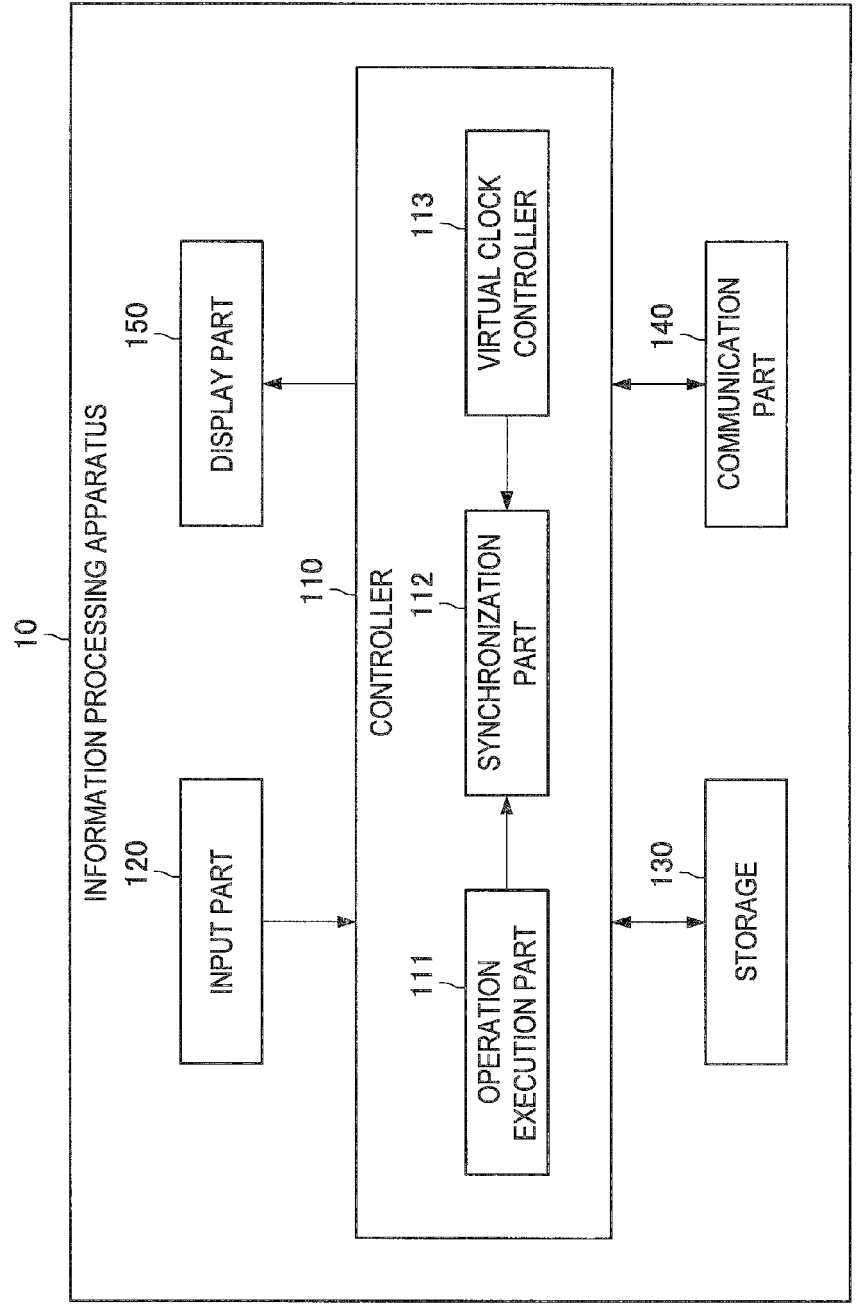
FIG. 2 is a diagram showing a functional configuration example of the information processing apparatus according to the embodiment.

Subsequently, a functional configuration example of an information processing apparatus 10 according to an embodiment of the present disclosure will be described. FIG. 2 is a diagram showing a functional configuration example of the information processing apparatus 10 according to an embodiment of the present disclosure. As shown in FIG. 2, the information processing apparatus 10 includes a controller 110, an input part 120, a storage 130, a communication part 140, and a display part 150.

The controller 110 corresponds to a processor such as a central processing unit (CPU). The controller 110 executes a program stored in the storage 130 or another storage medium, and thereby exhibits various functions that the controller 110 has. The controller 110 has respective functional blocks of an operation execution part 111, a synchronization part 112, and a virtual clock controller 113. The functions of the respective functional blocks will be described later.

The input part 120 detects an operation performed by a user and outputs the operation to the controller 110. For example, in the case where the input part 120 is configured from a touch panel, the operation performed by the user may correspond to an operation of tapping the touch panel. However, the input part 120 may also be configured from hardware other than the touch panel (a button, for example). Note that, although the input part 120 shown in the example of FIG. 2 is provided in an integrated manner with the information processing apparatus 10, the input part 120 may also be configured separately from the information processing apparatus 10.

The storage 130 stores a program for operating the controller 110 using a storage medium such as semiconductor memory or a hard disk. Further, for example, the storage 130 can also store various types of data used by a program. Note that, although the storage 130 shown in the example of FIG. 2 is provided in an integrated manner with the information processing apparatus 10, the storage 130 may also be configured separately from the information processing apparatus 10.

The communication part 140 is capable of communicating with another device (for example, another information processing apparatus 10). For example, in the case where the communication part 140 communicates with another information processing apparatus 10, the communication can be performed through a network. The communication scheme of the communication part 140 is not particularly limited, and the communication performed by the communication part 140 may be via wire or radio. Note that, although the communication part 140 shown in the example of FIG. 2 is provided in an integrated manner with the information processing apparatus 10, the communication part 140 may also be configured separately from the information processing apparatus 10.

The display part 150 displays various types of information in accordance with the control performed by the controller 110. For example, the display part 150 may be configured from a liquid crystal display (LCD), an organic electroluminescence (EL) display, and the like. Note that, although the display part 150 shown in the example of FIG. 2 is provided in an integrated manner with the information processing apparatus 10, the display part 150 may also be configured separately from the information processing apparatus 10. For example, a display device connected to the information processing apparatus 10 via wire or radio may be used as the display part 150.

Heretofore, a functional configuration example of the information processing apparatus 10 according to an embodiment of the present disclosure has been described.

<3. Details of Functions of Information Processing Apparatus>

Subsequently, details of functions of an information processing apparatus 10 according to an embodiment of the present disclosure will be described. Note that, though details of functions of the information processing apparatus 10A as an example of the information processing apparatus 10 according to an embodiment of the present disclosure will be mainly described, the information processing apparatus 10B may also have the same functions as the functions of the information processing apparatus 10A. Accordingly, the information processing apparatus 10B may also have the same functions as the functions of the information processing apparatus 10A described below.

First, in the information processing apparatus 10A, a system clock (hereinafter, also referred to as "SC", as the abbreviation of System Clock) is retained. The SC is read out from an operating system. The virtual clock controller 113 updates a virtual clock (hereinafter, also referred to as "VC", as the abbreviation of Virtual Clock) on the basis of the SC. The synchronization part 112 performs given data synchronization processing with the information processing apparatus 10B on the basis of the VC and the VC that is updated by the information processing apparatus 10B. Note that the VC updated in own apparatus may be simply referred to as "own VC", and the VC updated in a partner's apparatus may be simply referred to as "partner's VC".

According to such a configuration, the VC updated on the basis of the system clock is used for the data synchronization processing. Accordingly, ordering of processes executed by the respective operation execution parts 111 of the information processing apparatus 10A and the information processing apparatus 10B is grasped. Therefore, the data synchronization processing between the information processing apparatus 10A and the information processing apparatus 10B can be performed more accurately. For example, the synchronization part 112 may control the own VC on the basis of a comparison result obtained by comparing the own VC with the partner's VC.

Note that, in the description below, as an example of a given operation executed by the respective operation execution parts 111 of the information processing apparatus 10A and the information processing apparatus 10B, the case where the operation of updating files stored in their own storages 130 is performed will be mainly described. However, the given operation executed by the respective operation execution parts 111 of the information processing apparatus 10A and the information processing apparatus 10B is not limited to the operation of updating files stored in their own storages 130.

Further, as an example of the data synchronization processing performed by the respective synchronization parts 112 of the information processing apparatus 10A and the information processing apparatus 10B, the case where the process of adding, to the newer file selected from an own file and a partner's file, information indicating that the file is the newer file is performed will be mainly described. However, the data synchronization processing performed by the respective synchronization parts 112 of the information processing apparatus 10A and the information processing apparatus 10B is not limited to the processing of adding, to the newer file selected from an own file and a partner's file, information indicating that the file is the newer file is performed.

Figure 3:
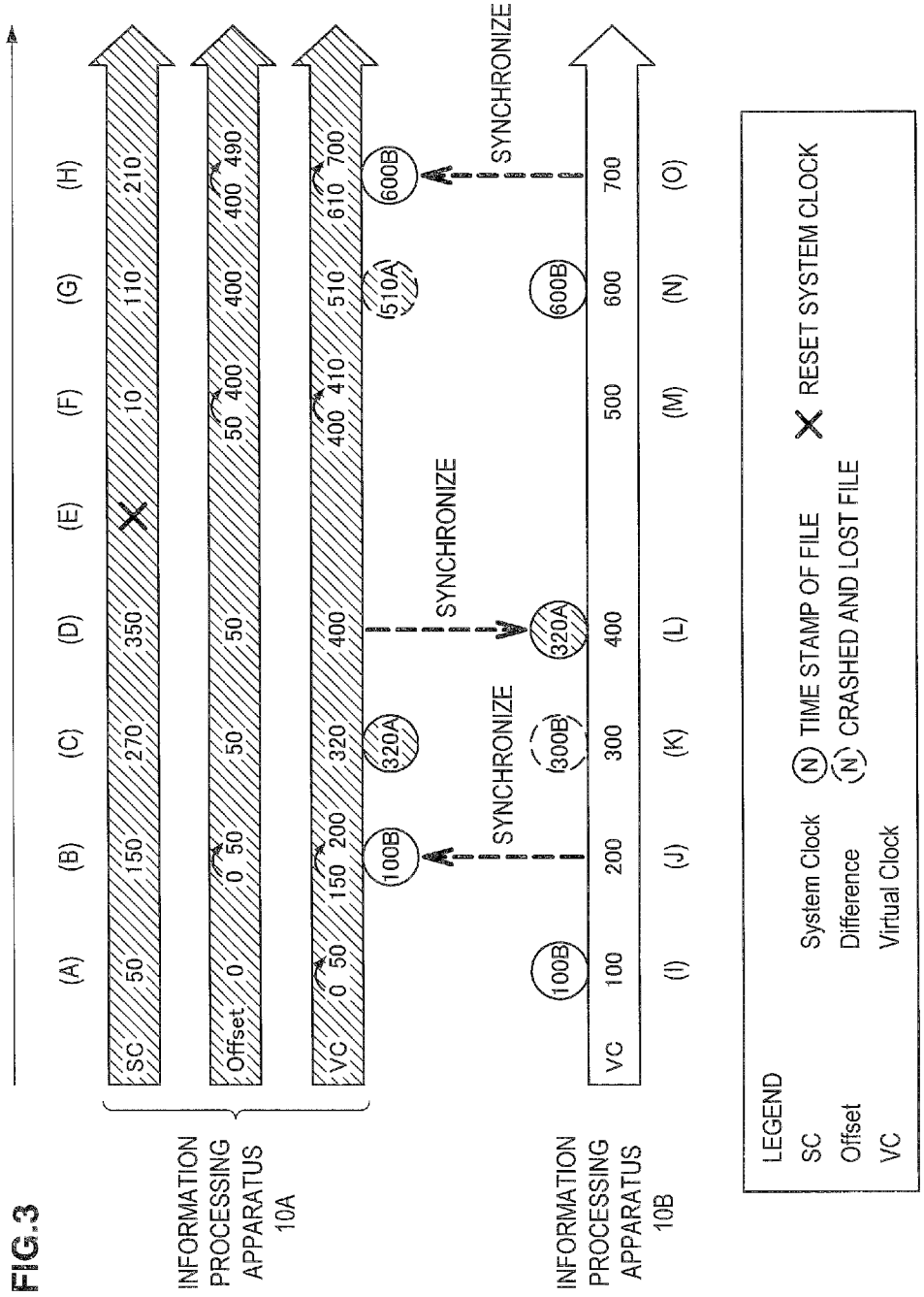
FIG. 3 is a diagram illustrating an example of an operating state of the information processing system according to the embodiment.

FIG. 3 is a diagram illustrating an example of an operation process of the information processing system 1 according to an embodiment of the present disclosure. With reference to FIG. 3, an example of each of the operation processes of the information processing apparatus 10A and the operation processes of the information processing apparatus 10B will be described. As shown in FIG. 3, the operating system of the information processing apparatus 10A retains the SC. Further, the storage 130 of the information processing apparatus 10A stores the VC. In addition, the storage 130 of the information processing apparatus 10A stores a difference (hereinafter, also referred to as "Offset") of the VC based on the SC. The above is also applied to the information processing apparatus 10B.

Figure 4:
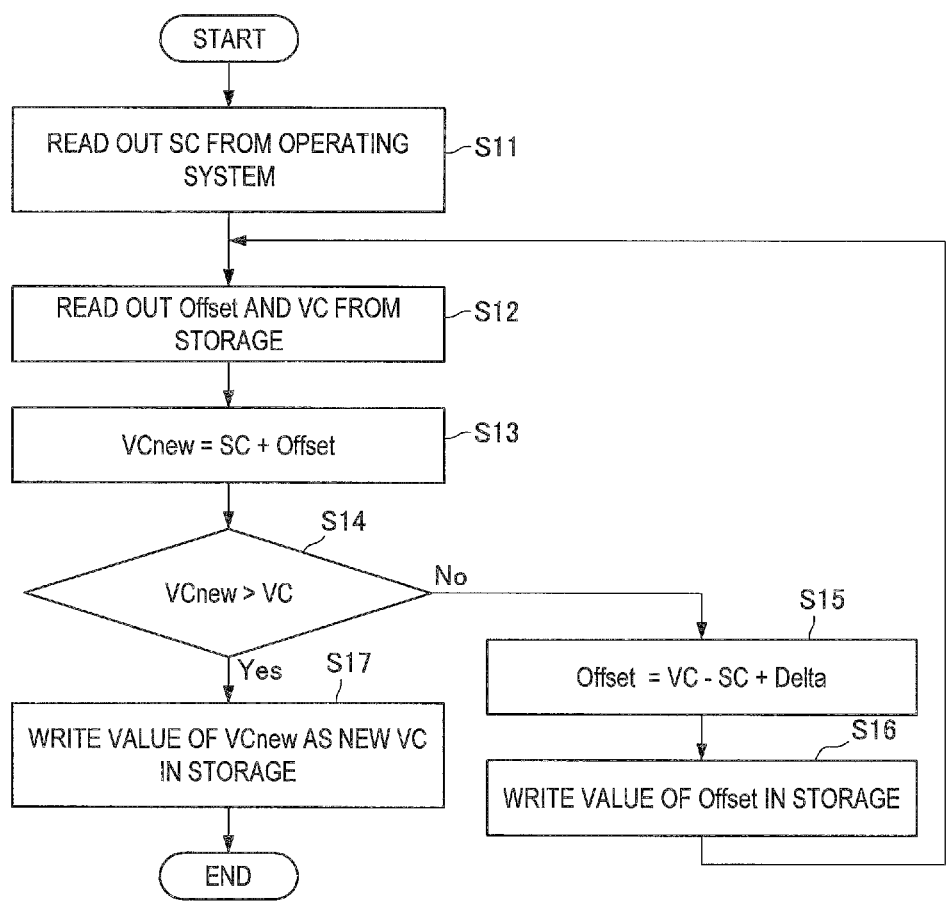
FIG. 4 is a flowchart showing an example of virtual clock updating operation.

First, description will be given of the VC updating operation. The VC updating operation may not be performed every given time period, and may be performed at least before creating or updating a file. FIG. 4 is a flowchart showing an example of the VC updating operation. Note that the example shown in FIG. 4 is merely an example of the VC updating operation. Accordingly, the VC updating operation is not limited to the example shown in FIG. 4. First, the virtual clock controller 113 reads out the SC that may correspond to a new system clock from the operating system (S11), and reads out the Offset and the VC from the storage 130 (S12). Each of the Offset and the VC read out from the storage 130 may correspond to a value after the last updating or an initial value.

Subsequently, the virtual clock controller 113 adds the SC and the Offset read out from the storage 130, and sets the addition result as a VCnew that corresponds to a new VC (S13). Here, the virtual clock controller 113 compares the VCnew with the VC (S14). In this case, in the case where the virtual clock controller 113 determines that the VCnew is greater than the VC ("Yes" in S14), that is, in the case where the VCnew is increased from the VC, the virtual clock controller 113 can determine that the SC is monotonically increased normally. Accordingly, the virtual clock controller 113 writes the value of the VCnew in the storage 130 as the new VC. When the SC is monotonically increased normally, such processes may enable the VC to be monotonically increased.

On the other hand, in the case where the virtual clock controller 113 determines that the VCnew is not greater than the VC ("No" in S14), that is, in the case where the VCnew is not increased from the VC, the virtual clock controller 113 can determine that the SC is not monotonically increased normally. Accordingly, the virtual clock controller 113 sets, as the Offset, the result obtained by subtracting the SC from the VC and adding Delta that may correspond to a given time period (S15). Subsequently, the virtual clock controller 113 writes the value of the Offset in the storage 130 (S16), and the processing returns to S12. As will be described later, also when the SC is not monotonically increased normally, such processes enable the VC to be monotonically increased.

Here, referring to (A) shown in FIG. 3, a state is shown in which the information processing apparatus 10A is as follows: (SC, Offset, VC)=(50, 0, 0). When the VC updating operation shown in FIG. 4 is performed in this state, the VCnew is calculated to be SC+Offset=50+0=50 in S13, which corresponds to "Yes" in S14, and the VC is replaced with VCnew=50 in S17. Accordingly, in (A) shown in FIG. 3, the VC is updated from 0 to 50.

Further, referring to (I) shown in FIG. 3, as the result of performing the VC updating operation shown in FIG. 4, a state is shown in which the information processing apparatus 10B is as follows: (VC)=100. Subsequently, let us assume that the operation execution part 111 of the information processing apparatus 10B creates a file in an offline state. In this case, the synchronization part 112 of the information processing apparatus 10B causes the VC at the time of creating the file to be stored as a time stamp. In the example shown in (I) of FIG. 3, the synchronization part 112 of the information processing apparatus 10B causes "100" to be stored as the time stamp.

Figure 5:
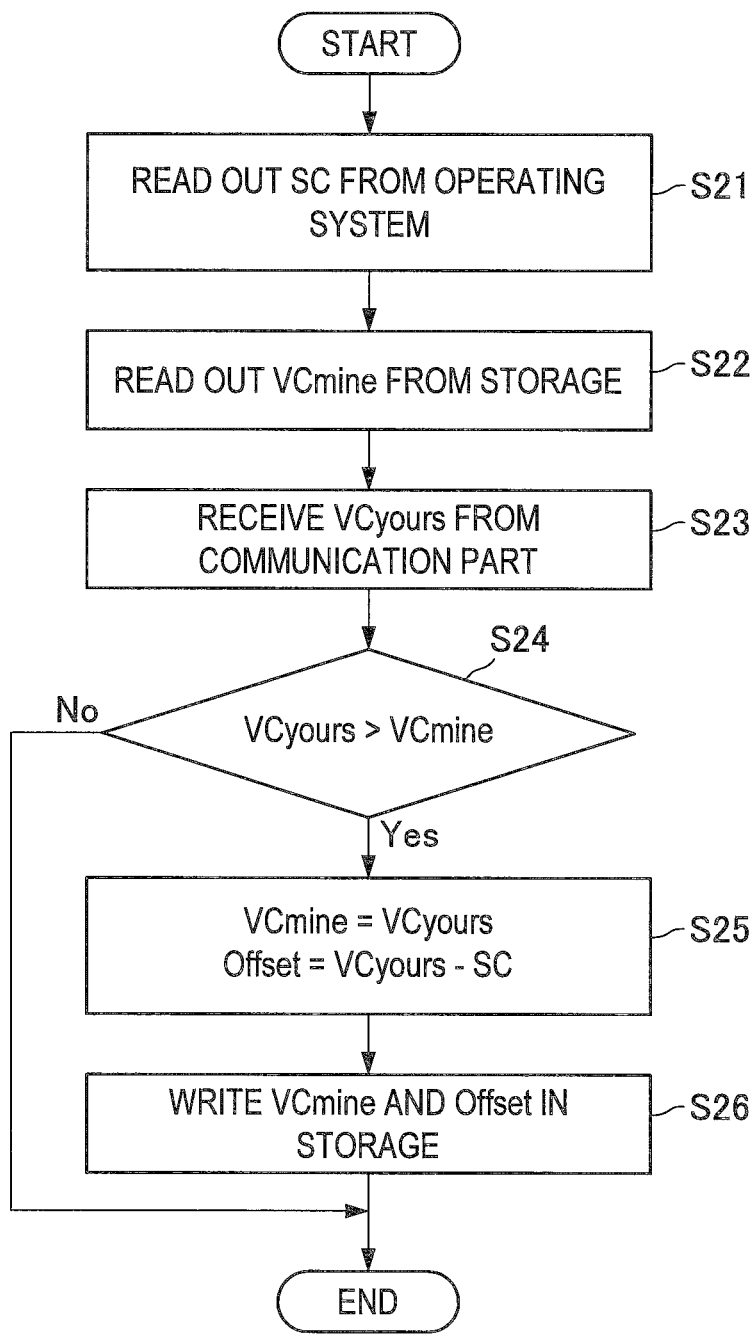
FIG. 5 is a flowchart showing an example of operation for equalizing virtual clocks with each other.

Subsequently, description will be given of the operation for equalizing VC's with each other. The operation for equalizing VC's with each other may be performed when the information processing apparatus 10A and the information processing apparatus 10B are switched from the offline state to the online state and the information processing apparatus 10A and the information processing apparatus 10B communicate with each other. FIG. 5 is a flowchart showing an example of the operation for equalizing the VC's with each other. Note that the example shown in FIG. 5 is merely an example of the operation for equalizing the VC's with each other. Accordingly, the operation for equalizing the VC's with each other is not limited to the example shown in FIG. 5. First, the synchronization part 112 reads out an SC that may correspond to a new system clock from the operating system (S21), and reads out a VCmine from the storage 130 (S22). The VCmine read out from the storage 130 may correspond to the own VC. Further, the synchronization part 112 receives a VCyours from the communication part 140 (S23). The VCyours may correspond to the partner's VC.

Subsequently, the synchronization part 112 compares the VCmine read out from the storage 130 with the VCyours received from the communication part 140 (S24). In this case, in the case where the synchronization part 112 determines that the VCyours is not greater than the VCmine ("No" in S24), that is, in the case where the own VC is equal to the partner's VC or the own VC is greater than the partner's VC, the synchronization part 112 determines that it is not necessary to update the own VC, and terminates the operation for equalizing the VC's with each other. On the other hand, in the case where the synchronization part 112 determines that the VCyours is greater than the VCmine ("Yes" in S24), the VCmine is replaced with the VCyours, and the Offset is replaced with the result obtained by subtracting the SC from the VCyours (S25). The synchronization part 112 writes the VCmine and the Offset in the storage 130 (S26).

Here, referring to (B) shown in FIG. 3, as the result of performing the VC updating operation shown in FIG. 4, a state is shown in which the information processing apparatus 10A is as follows: (SC, Offset, VC)=(150, 0, 150). Further, referring to (J) shown in FIG. 3, as the result of performing the VC updating operation shown in FIG. 4, a state is shown in which the information processing apparatus 10B is as follows: (VC)=(200). In such states, let us assume that the information processing apparatus 10A and the information processing apparatus 10B are switched from the offline state to the online state and are in a timing in which the information processing apparatus 10A and the information processing apparatus 10B communicate with each other.

At this time, when the operation for equalizing the VC's with each other shown in FIG. 5 is performed, the VCyours is "200" and the VCmine is "150" in S24, which corresponds to "Yes" in S24, and the VCmine is replaced with VCyours=200 and the Offset is replaced with 200−150=50 in S25. Further, since the synchronization part 112 of the information processing apparatus 10A does not create a file by itself, the synchronization part 112 performs the data synchronization processing by copying a file generated by the operation execution part 111 of the information processing apparatus 10B into the storage 130.

Figure 6:
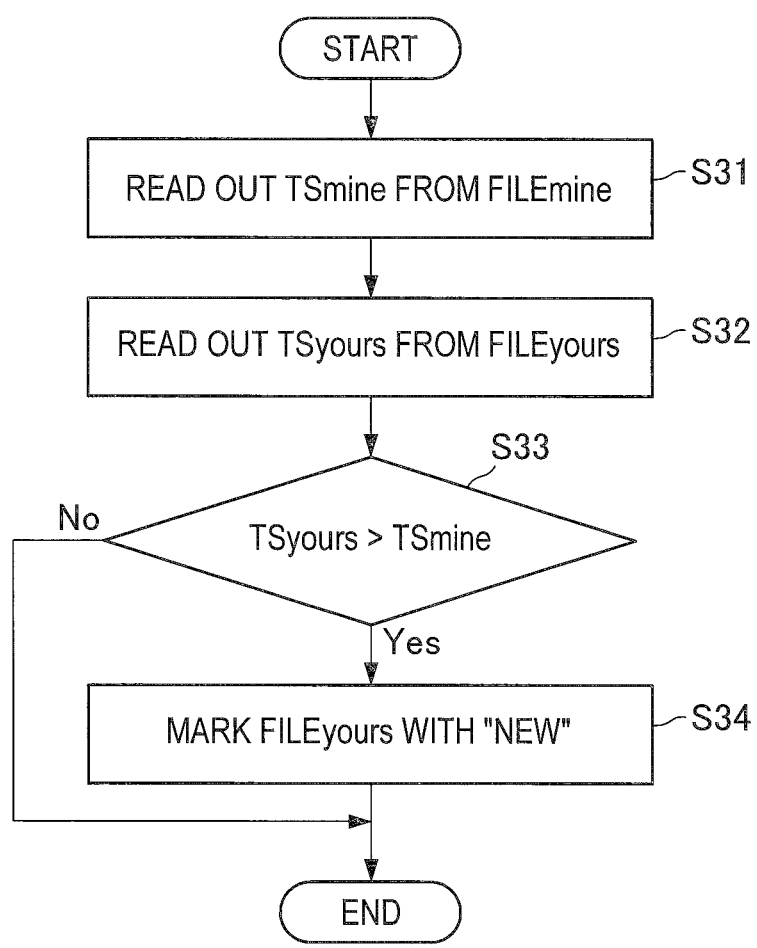
FIG. 6 is a flowchart showing an example of operation for determining new file updating operation as an example of data synchronization processing.

Subsequently, as an example of the data synchronization processing, an operation for determining new file updating operation will be described. The operation for determining new file updating operation is performed when the information processing apparatus 10A and the information processing apparatus 10B are switched from the offline state to the online state and the information processing apparatus 10A and the information processing apparatus 10B communicate with each other. FIG. 6 is a flowchart showing an example of operation for determining new file updating operation as an example of data synchronization processing. Note that the example shown in FIG. 6 is merely an example of the operation for determining new file updating operation. Therefore, the operation for determining new file updating operation is not limited to the example shown in FIG. 6.

First, the synchronization part 112 reads out a time stamp TSmine from a FILEmine that corresponds to an own file (S31), and reads out a time stamp TSyours from a FILEyours that corresponds to a partner's file (S32). Further, the synchronization part 112 compares the TSmine read out from the FILEmine with the TSyours read out from the FILEyours (S33). In this case, in the case where the synchronization part 112 determines that the TSyours is not greater than the TSmine ("No" in S33), that is, in the case where TSmine is equal to the TSyours or the TSmine is greater than the TSyours, since it is determined that the FILEmine is the newer file, the synchronization part 112 terminates the operation for determining new file updating operation.

On the other hand, in the case where the synchronization part 112 determines that the TSyours is greater than the TSmine ("Yes" in S33), since it is determined that the FILEyours is the newer file, the FILEyours is marked with "new" (S34). For example, the FILEyours is marked with "new" by adding information indicating that the file is the newer file to the FILEyours.

Here, referring to (C) shown in FIG. 3, as the result of performing the VC updating operation shown in FIG. 4, a state is shown in which the information processing apparatus 10A is as follows: (SC, Offset, VC)=(270, 50, 320). Further, referring to (K) shown in FIG. 3, as the result of performing the VC updating operation shown in FIG. 4, a state is shown in which the information processing apparatus 10B is as follows: (VC)=(300). Subsequently, let us assume that, in the offline state, as shown in (C) of FIG. 3, the operation execution part 111 of the information processing apparatus 10A updates the file and "320" is attached to the time stamp. In addition, let us assume that, in the offline state, as shown in (K) of FIG. 3, the operation execution part 111 of the information processing apparatus 10B updates the file and "300" is attached to the time stamp.

Here, referring to (D) shown in FIG. 3, as the result of performing the VC updating operation shown in FIG. 4, a state is shown in which the information processing apparatus 10A is as follows: (SC, Offset, VC)=(350, 50, 400). Further, referring to (L) shown in FIG. 3, as the result of performing the VC updating operation shown in FIG. 4, a state is shown in which the information processing apparatus 10B is as follows: (VC)=(400). In this state, let us assume that the information processing apparatus 10A and the information processing apparatus 10B are switched to be in the online state. In this case, since the VC's are equal to each other, the VC and the Offset are not updated even if the operation for equalizing the VC's with each other shown in FIG. 5 is performed.

Subsequently, when the new file updating operation is performed, since the TSyours is "300" and the TSmine is "320", the TSyours is smaller than the TSmine in S33. Accordingly, as shown in (D) of FIG. 3, the own file stays as the newer file in the information processing apparatus 10A. On the other hand, as for the information processing apparatus 10B, the TSyours is greater than the TSmine in S33. Therefore, as shown in (L) of FIG. 3, in the information processing apparatus 10B, the synchronization part 112 copies the partner's file into the own storage 130 and the file is marked with "new".

Here, there may be a case where the SC of the information processing apparatus 10A is not monotonically increased normally. For example, the SC may not be monotonically increased normally in the case where the battery that drives an internal clock of the information processing apparatus 10A is completely discharged, for example. In that case, for example, the SC may show "0". Referring to (E) shown in FIG. 3, a state is shown in which the SC of the information processing apparatus 10A is not monotonically increased normally. According to the present embodiment, in such a state, the virtual clock may also be not monotonically increased normally.

Here, referring to (F) shown in FIG. 3, since the SC is returned to "0" once, a state is shown in which the information processing apparatus 10A is as follows: (SC, Offset, VC)=(10, 50, 400). When the VC updating operation shown in FIG. 4 is performed in this state, the VCnew is calculated to be SC+Offset=10+50=60 in S13, which corresponds to "No" in S14, and, in the case where the Delta is "10", the Offset is calculated to be 400−10+10=400 in S15.

Accordingly, when the processing reaches S13 next, the VC is calculated to be VCnew=10+400=410, which corresponds to "Yes" in S14, and the VC is replaced with VCnew=410 in S17. Therefore, in (F) shown in FIG. 3, the VC is updated from "400" to "410". Note that the value of the Delta is not limited to "10", and may be changed appropriately. According to such a configuration, the monotonic increase of the virtual clock is kept normal even in the state where the SC is not monotonically increased normally.

Further, referring to (M) shown in FIG. 3, as the result of performing the VC updating operation shown in FIG. 4, a state is shown in which the information processing apparatus 10B is as follows: (VC)=500. In such a state, let us assume that the operation execution part 111 of the information processing apparatus 10B updates a file. In this case, the synchronization part 112 of the information processing apparatus 10B causes the VC at the time of creating the file to be stored as a time stamp. In the example shown in (I) of FIG. 3, the synchronization part 112 of the information processing apparatus 10B causes "100" to be stored as the time stamp.

Here, referring to (G) shown in FIG. 3, as the result of performing the VC updating operation shown in FIG. 4, a state is shown in which the information processing apparatus 10A is as follows: (SC, Offset, VC)=(110, 400, 510). Further, referring to (N) shown in FIG. 3, as the result of performing the VC updating operation shown in FIG. 4, a state is shown in which the information processing apparatus 10B is as follows: (VC)=(600). Further, let us assume that, in the offline state, as shown in (G) of FIG. 3, the operation execution part 111 of the information processing apparatus 10A updates the file and "510" is attached to the time stamp. In addition, let us assume that, in the offline state, as shown in (N) of FIG. 3, the operation execution part 111 of the information processing apparatus 10B updates the file and "600" is attached to the time stamp.

Here, referring to (H) shown in FIG. 3, as the result of performing the VC updating operation shown in FIG. 4, a state is shown in which the information processing apparatus 10A is as follows: (SC, Offset, VC)=(210, 400, 610). Further, referring to (O) shown in FIG. 3, as the result of performing the VC updating operation shown in FIG. 4, a state is shown in which the information processing apparatus 10B is as follows: (VC)=(700). In this state, let us assume that the information processing apparatus 10A and the information processing apparatus 10B are switched to be in the online state. In this case, when the operation for equalizing the VC's with each other shown in FIG. 5 is performed, the VCyours is "700" and the VCmine is "610" in S24, which corresponds to "Yes" in S24, and the VCmine is replaced with VCyours=700 and the Offset is replaced with 700−210=490.

Subsequently, when the new file updating operation shown in FIG. 6 is performed, since the TSyours is "600" and the TSmine is "510", the TSyours is greater than the TSmine in S33. Accordingly, as shown in (H) of FIG. 3, in the information processing apparatus 10A, the synchronization part 112 copies the partner's file into the own storage 130 and the file is marked with "new". On the other hand, in the information processing apparatus 10B, the TSyours is smaller than the TSmine in S33. Therefore, as shown in (0) of FIG. 3, in the information processing apparatus 10B, the own file stays as the newer file.

Figure 7:
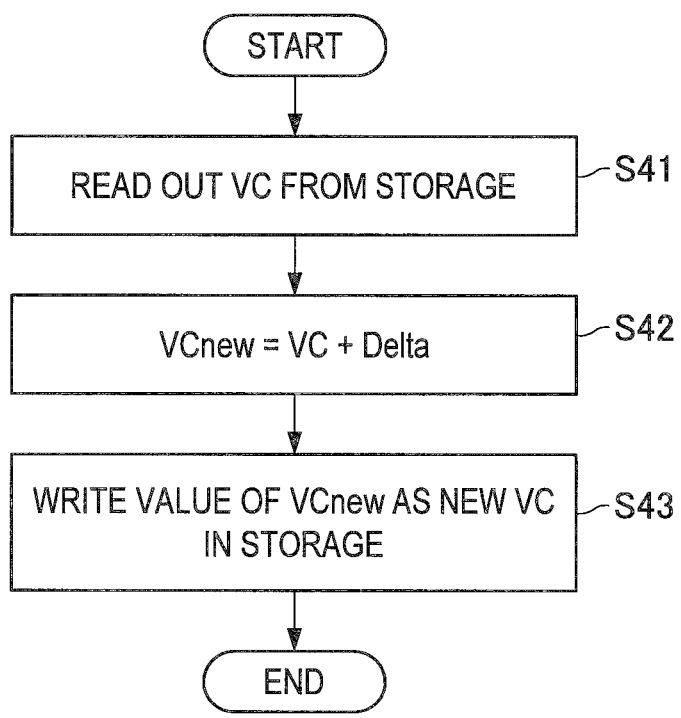
FIG. 7 is a flowchart showing a modified example of the virtual clock updating operation.

Subsequently, modified examples of the operation of the information processing apparatus 10 according to an embodiment of the present disclosure will be described. First, a modified example of the VC updating operation will be described. FIG. 7 is a flowchart showing a modified example of the VC updating operation. Note that the example shown in FIG. 7 is merely an example of the VC updating operation. Accordingly, the VC updating operation is not limited to the example shown in FIG. 7. First, when notified of an elapsed time period corresponding to the Delta from the SC, the virtual clock controller 113 reads out the VC from the storage 130 (S41). The VC read out from the storage 130 may correspond to a value after the last updating or an initial value.

Subsequently, the virtual clock controller 113 adds the VC read out from the storage 130 and the Delta, and sets the addition result as a VCnew that corresponds to a new VC (S42). Subsequently, the virtual clock controller 113 writes the value of VCnew in the storage 130 (S43). According to such processing, the VC can be monotonically increased. The VC updating operation shown in FIG. 7 may be repeated every time period corresponding to the Delta.

Figure 8:
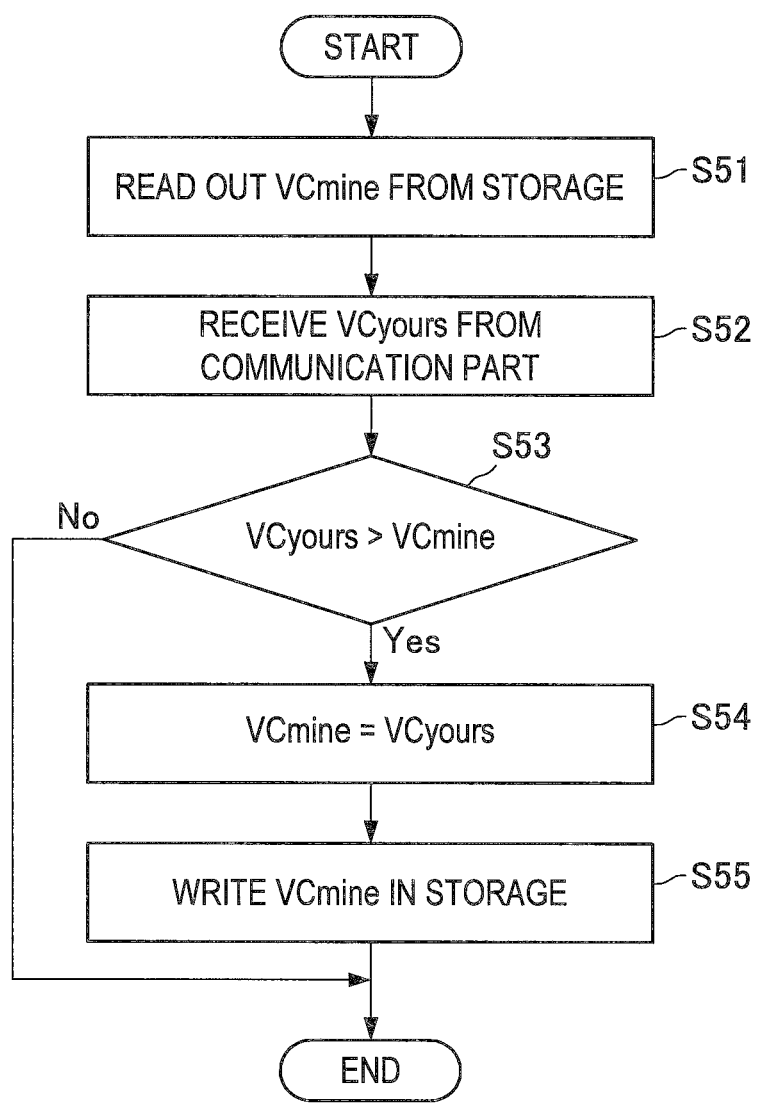
FIG. 8 is a flowchart showing a modified example of the operation for equalizing virtual clocks with each other.

Next, a modified example of the operation for equalizing VC's with each other will be described. FIG. 8 is a flowchart showing a modified example of the operation for equalizing VC's with each other. Note that the example shown in FIG. 8 is merely an example of the operation for equalizing VC's with each other. Accordingly, the operation for equalizing VC's with each other is not limited to the example shown in FIG. 8. First, the synchronization part 112 reads out a VCmine from the storage 130 (S51). The VCmine read out from the storage 130 may correspond to the own VC. Further, the synchronization part 112 receives a VCyours from the communication part 140 (S52). The VCyours may correspond to the partner's VC.

Subsequently, the synchronization part 112 compares the VCmine read out from the storage 130 with the VCyours received from the communication part 140 (S53). In this case, in the case where the synchronization part 112 determines that the VCyours is not greater than the VCmine ("No" in S53), that is, in the case where the own VC is equal to the partner's VC or the own VC is greater than the partner's VC, the synchronization part 112 determines that it is not necessary to update the own VC, and terminates the operation for equalizing the VC's with each other. On the other hand, in the case where the synchronization part 112 determines that the VCyours is greater than the VCmine ("Yes" in S53), the VCmine is replaced with the VCyours (S54). The synchronization part 112 writes the VCmine in the storage 130 (S55).

Heretofore, details of functions of the information processing apparatus 10 according to an embodiment of the present disclosure have been described.

<4. Other Configuration Examples of Information Processing System>

Next, other configuration examples of the information processing system 1 according to an embodiment of the present disclosure will be described. In the above, an example has been given in which the information processing system 1 includes two information processing apparatuses 10. However, the information processing system 1 may also include three or more information processing apparatuses 10. In that case, the three or more information processing apparatuses 10 are connected to each other directly or indirectly, and, if the synchronization processes between two information processing apparatuses 10 that are directly connected to each other are performed in sequence, the synchronization processes between the three or more information processing apparatuses 10 may be performed.

Figure 9:
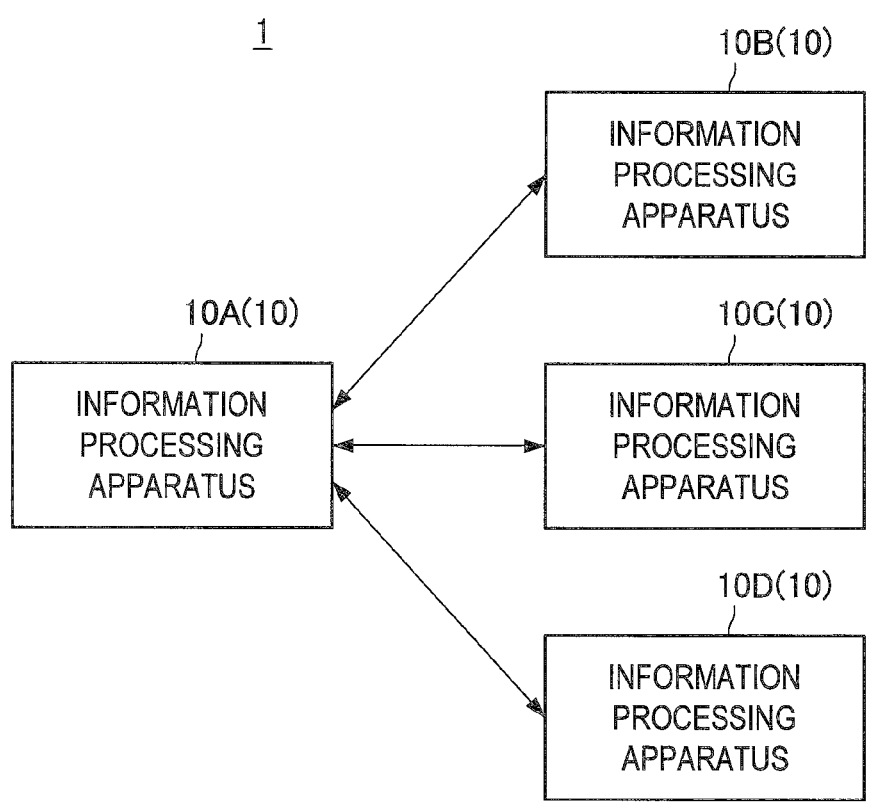
FIG. 9 is a diagram showing another configuration example of the information processing system.

Examples of a topology for directly or indirectly connecting three or more information processing apparatuses 10 are not limited. For example, examples of the topology for directly or indirectly connecting three or more information processing apparatuses 10 may include a topology (star shape) formed as follows: to one information processing apparatus 10, other information processing apparatuses 10 directly establish connections. FIG. 9 is a diagram showing another configuration example of the information processing system 1. In the example shown in FIG. 9, information processing apparatuses 10B to 10D are directly connected to an information processing apparatus 10A, and in this way, the topology of the star shape is formed.

Figure 10:
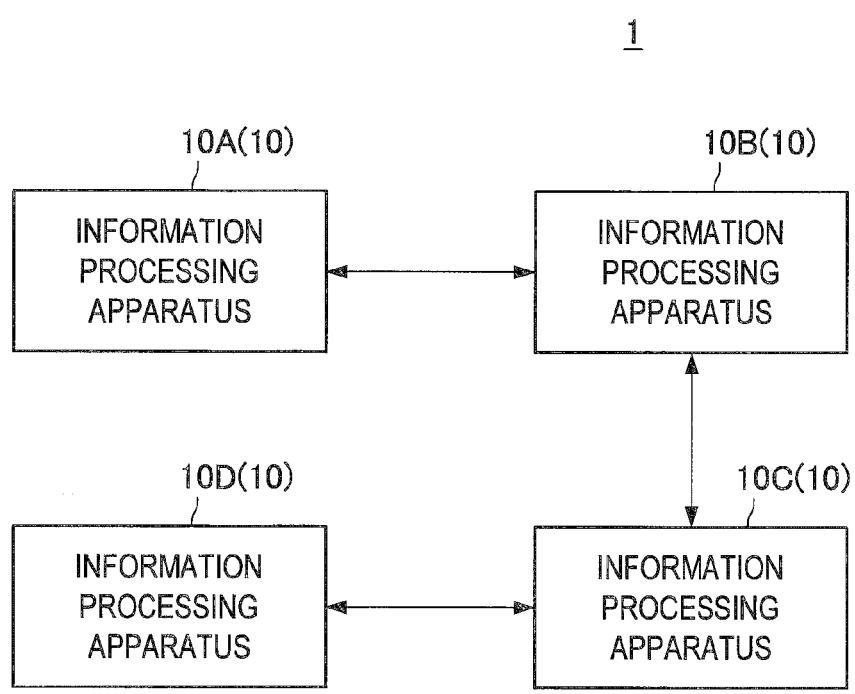
FIG. 10 is a diagram showing another configuration example of the information processing system.

Further, examples of the topology for directly or indirectly connecting three or more information processing apparatuses 10 may also include a topology (dizzy chain formation) formed as follows: multiple information processing apparatuses 10 are connected in a line. FIG. 10 is a diagram showing another configuration example of the information processing system 1. In the example shown in FIG. 10, information processing apparatuses 10A to 10D are connected in a line to an information processing apparatus 10A, and in this way, the topology of the dizzy chain formation is formed.

Heretofore, other configuration examples of the information processing system 1 according to an embodiment of the present disclosure have been described.

<5. Hardware Configuration Example of Information Processing Apparatus>

Figure 11:
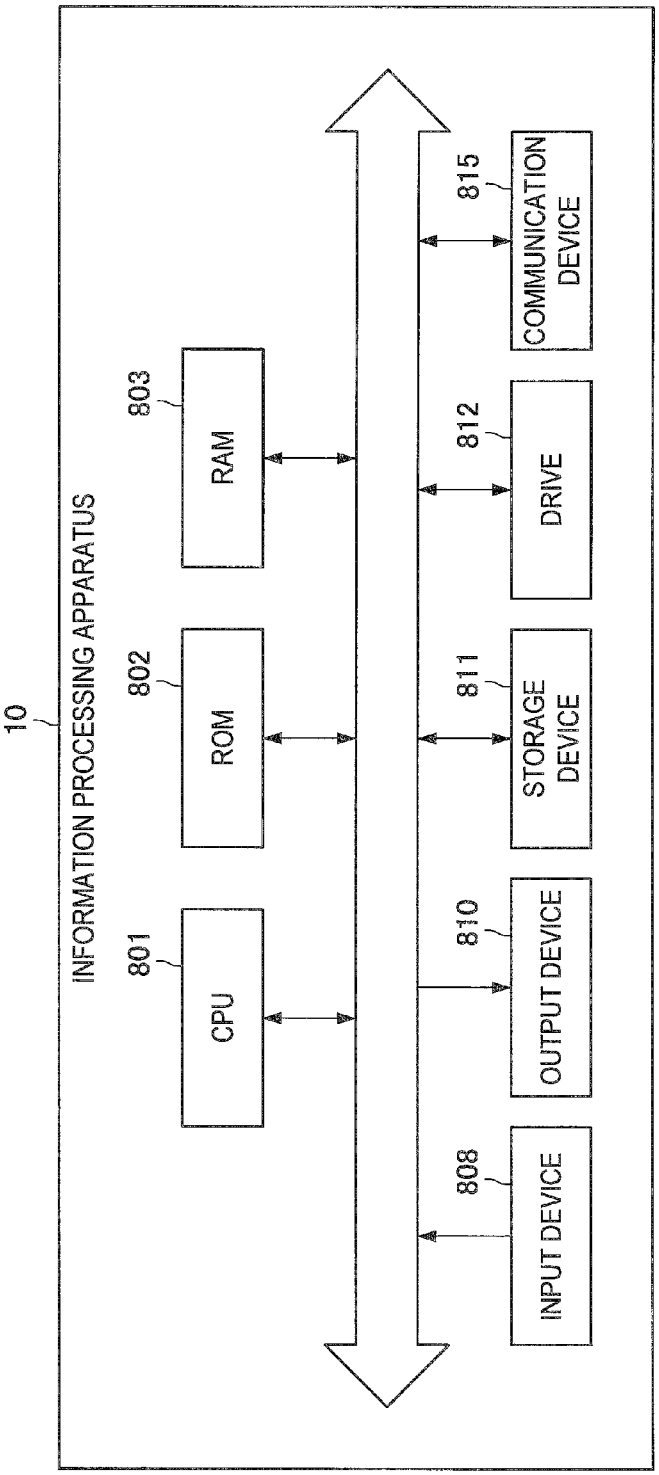
FIG. 11 is a diagram showing a hardware configuration example of the information processing apparatus.

Next, a hardware configuration example of the information processing apparatus 10 according to an embodiment of the present disclosure will be described. FIG. 11 is a diagram showing a hardware configuration example of the information processing apparatus 10 according to an embodiment of the present disclosure. However, the hardware configuration example shown in FIG. 11 is merely an example of the hardware configuration of the information processing apparatus 10. Accordingly, the hardware configuration of the information processing apparatus 10 is not limited to the example shown in FIG. 11.

As shown in FIG. 11, the information processing apparatus 10 includes a central processing unit (CPU) 801, read only memory (ROM) 802, random access memory (RAM) 803, an input device 808, an output device 810, a storage device 811, drive 812, and a communication device 815. The CPU 801 functions as an arithmetic processing unit and a control unit, and controls entire operation of the information processing apparatus 10 in accordance with various programs. Further, the CPU 801 may be a microprocessor. The ROM 802 stores a program, a calculation parameter, and the like used by the CPU 801. The RAM 803 temporarily stores a program used in execution of the CPU 801, a parameter varying as appropriate during the execution, and the like. They are connected with each other via a host bus configured from a CPU bus or the like.

The input device 808 is configured from, for example, an operation part for inputting information by a user, such as a mouse, a keyboard, a touch panel, a button, a microphone, a switch, or a lever, and an input control circuit which generates an input signal based on the input by the user and outputs the generated input signal to the CPU 801. The user of the information processing apparatus 10 can input various kinds of data to the information processing apparatus 10 and can instruct the information processing apparatus 10 to perform a processing operation by operating the input device 808.

The output device 810 may include, for example, a display device such as a liquid crystal display (LCD), an organic light emitting diode (OLED), or a lamp. Further, the output device 810 may include an audio output device such as a speaker or headphones. For example, a display device displays an image that has been imaged or an image that has been generated. On the other hand, an audio output device converts audio data or the like into audio and outputs the audio.

The storage device 811 is a device for storing data configured as an example of a storage of the information processing apparatus 10. The storage device 811 may include, for example, a storage medium, a recording device for recording data in the storage medium, a reading device for reading out the data from the storage medium, and a deletion device for deleting the data recorded in the storage medium. The storage device 811 stores a program executed by the CPU 801 and various data.

The drive 812 is a reader/writer for the storage medium and is built in or externally attached to the information processing apparatus 10. The drive 812 reads out information recorded in a removable storage medium which is mounted thereto, such as a magnetic disk, an optical disc, a magneto-optical disk, or a semiconductor memory, and outputs the information to the RAM 803. Further, the drive 812 can also write information in the removable storage medium.

The communication device 815 is a communication interface configured from a communication device or the like for establishing a connection with a network. In addition, the communication device 815 may be a wireless local area network (LAN) enabled communication device, a long term evolution (LTE) enabled communication device, or a wired communication device for performing wired communication. The communication device 815 is capable of communicating with another device through a network.

Heretofore, a hardware configuration example of the information processing apparatus 10 according to an embodiment of the present disclosure has been described.

<6. Conclusion>

As described above, according to embodiments of the present disclosure, there is provided the information processing apparatus 10A including the virtual clock controller 113 configured to update a first virtual clock on the basis of a system clock, and the synchronization part 112 configured to perform given data synchronization processing with another information processing apparatus 10B on the basis of the first virtual clock and a second virtual clock that is updated by the information processing apparatus 10B. According to such a configuration, the data synchronization processing between the information processing apparatus 10A and the information processing apparatus 10B can be performed more accurately.

Further, according to such a configuration, the system clocks of the information processing apparatus 10A and the information processing apparatus 10B may not be synchronized. For example, a technique may be assumed which provides a master clock that is accessible by the information processing apparatus 10A and the information processing apparatus 10B. However, in the case of adopting such a technique, it is estimated that there will be an issue of a communication load for making an inquiry to the master clock about a real clock. The present embodiment is free from such a communication load.

It should be understood by those skilled in the art that various modifications, combinations, sub-combinations and alterations may occur depending on design requirements and other factors insofar as they are within the scope of the appended claims or the equivalents thereof.

For example, the operation of the information processing apparatus 10 is not necessarily processed in a time-series order stated in the flowchart. For example, the operation of the information processing apparatus 10 may be processed in different order from the flowcharts, or at least some parts of the operation stated in the flowchart may be processed in a parallel manner.

Further, it is also possible to create a program for causing hardware such as a CPU, ROM, and RAM, which are built in a computer, to exhibit substantially the same functions as those of respective functions of the information processing apparatus 10 described above. Further, there may also be provided a computer-readable recording medium having the program recorded thereon.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An information processing apparatus including:
a virtual clock controller configured to update a first virtual clock on the basis of a system clock; and
a synchronization part configured to perform given data synchronization processing with another information processing apparatus on the basis of the first virtual clock and a second virtual clock that is updated by the another information processing apparatus.

(2) The information processing apparatus according to (1),
wherein the synchronization part controls the first virtual clock on the basis of a comparison result obtained by comparing the first virtual clock with the second virtual clock.

(3) The information processing apparatus according to (2),
wherein, when the second virtual clock is greater than the first virtual clock, the synchronization part causes the first virtual clock to match with the second virtual clock.

(4) The information processing apparatus according to any one of (1) to (3), further including
an operation execution part configured to execute a given operation,
wherein the synchronization part causes the first virtual clock showing a time at which the given operation is executed to be stored in a storage as a first time stamp, and performs the data synchronization processing on the basis of the first time stamp.

(5) The information processing apparatus according to (4),
wherein, when the second virtual clock showing a time at which the another information processing apparatus performs a given operation is acquired as a second time stamp, the synchronization part performs the data synchronization processing on the basis of the first time stamp and the second time stamp.

(6) The information processing apparatus according to (5),
wherein the synchronization part determines that one of an operation performed by the operation execution part and an operation performed by the another information processing apparatus is a newer operation on the basis of a magnitude relationship between the first time stamp and the second time stamp.

(7) The information processing apparatus according to (6),
wherein the operation execution part executes a first file updating operation, the first file being stored in the storage,
wherein the another information processing apparatus executes a second file updating operation, and
wherein the synchronization part determines that one of the first file updating operation and the second file updating operation as a newer file updating operation on the basis of the magnitude relationship.

(8) The information processing apparatus according to (7),
wherein, when the synchronization part determines that the second file updating operation is a newer file updating operation, the synchronization part adds, to the second file provided from the another information processing apparatus, information indicating that the second file is a newer file.

(9) The information processing apparatus according to any one of (1) to (8),
wherein the virtual clock controller updates the first virtual clock by adding a difference of the first virtual clock based on the system clock to a newer system clock.

(10) The information processing apparatus according to (9),
wherein, when a result obtained by adding the difference to the newer system clock is not increased from a last updated first virtual clock, the virtual clock controller adjusts the difference by subtracting the newer system clock from the last updated first virtual clock and adding a given time period.

(11) The information processing apparatus according to (9) or (10), wherein, when the second virtual clock is greater than the first virtual clock, the synchronization part replaces the difference with a result obtained by subtracting the newer system clock from the second virtual clock.

(12) The information processing apparatus according to any one of (1) to (8), wherein, when receiving information that is sent every given time period on the basis of the system clock, the virtual clock controller updates the first virtual clock by increasing the first virtual clock by the given time period.

(13) An information processing method including:

updating a first virtual clock on the basis of a system clock; and performing, by a processor, given data synchronization processing with another information processing apparatus on the basis of the first virtual clock and a second virtual clock that is updated by the another information processing apparatus.

(14) A non-transitory computer-readable recording medium having a program recorded thereon, the program being for causing a computer to function as an information processing apparatus including a virtual clock controller configured to update a first virtual clock on the basis of a system clock, and a synchronization part configured to perform given data synchronization processing with another information processing apparatus on the basis of the first virtual clock and a second virtual clock that is updated by the another information processing apparatus.

(15) An information processing system including:

a first information processing apparatus; and a second information processing apparatus, wherein the first information processing apparatus includes a virtual clock controller configured to update a first virtual clock on the basis of a system clock, and a synchronization part configured to perform given data synchronization processing with the second information processing apparatus on the basis of the first virtual clock and a second virtual clock that is updated by the second information processing apparatus, and wherein the second information processing apparatus includes a virtual clock controller configured to update the second virtual clock on the basis of a system clock, and a synchronization part configured to perform given data synchronization processing with the first information processing apparatus on the basis of the first virtual clock and the second virtual clock.

What is claimed is:

1. An information processing apparatus, comprising:

a virtual clock controller configured to update a first virtual clock on the basis of a system clock; and a synchronization part configured to synchronize given data with another information processing apparatus on the basis of the first virtual clock and a second virtual clock that is updated by the another information processing apparatus, wherein the virtual clock controller is configured to update the first virtual clock based on an addition of a difference of the first virtual clock based on the system clock and a newer system clock, and wherein, in an event a result obtained based on an addition of the difference to the newer system clock is less than or equal to a last updated first virtual clock, the virtual clock controller is configured to adjust the difference based on a subtraction of the newer system clock from the last updated first virtual clock and addition of a given time period.

2. The information processing apparatus according to claim 1, wherein the synchronization part is configured to control the first virtual clock on the basis of a comparison result obtained based on a comparison of the first virtual clock with the second virtual clock.

3. The information processing apparatus according to claim 2, wherein, in an event the second virtual clock is greater than the first virtual clock, the synchronization part is configured to cause the first virtual clock to match with the second virtual clock.

4. The information processing apparatus according to claim 1, further comprising an operation execution part configured to execute a given operation, wherein the synchronization part is configured to cause the first virtual clock that shows a time at which the given operation is executed to be stored in a storage as a first time stamp, and synchronize the data on the basis of the first time stamp.

5. The information processing apparatus according to claim 4, wherein, in an event the second virtual clock that shows a time at which the another information processing apparatus performs a given operation is acquired as a second time stamp, the synchronization part is configured to synchronize the data on the basis of the first time stamp and the second time stamp.

6. The information processing apparatus according to claim 5, wherein the synchronization part is configured to determine that one of an operation performed by the operation execution part and an operation performed by the another information processing apparatus is a newer operation on the basis of a magnitude relationship between the first time stamp and the second time stamp.

7. The information processing apparatus according to claim 6, wherein the operation execution part is configured to execute a first file updating operation, the first file being stored in the storage, wherein the another information processing apparatus is configured to execute a second file updating operation, and wherein the synchronization part is configured to determine that one of the first file updating operation and the second file updating operation as a newer file updating operation on the basis of the magnitude relationship.

8. The information processing apparatus according to claim 7, wherein, in an event the synchronization part determines that the second file updating operation is a newer file updating operation, the synchronization part is configured to add, to the second file provided from the another information processing apparatus, information that indicates that the second file is a newer file.

9. The information processing apparatus according to claim 1,
wherein, in an event the second virtual clock is greater than the first virtual clock, the synchronization part is configured to replace the difference with a result obtained based on a subtraction of the newer system clock from the second virtual clock.

10. The information processing apparatus according to claim 1,
wherein, in an event receiving information that is sent every given time period on the basis of the system clock, the virtual clock controller is configured to update the first virtual clock by increasing the first virtual clock by the given time period.

11. An information processing method, comprising:
updating a first virtual clock on the basis of a system clock; and
synchronizing data, by a processor, with another information processing apparatus on the basis of the first virtual clock and a second virtual clock that is updated by the another information processing apparatus,
wherein the first virtual clock is updated by adding a difference of the first virtual clock based on the system clock to a newer system clock, and
wherein, in an event a result obtained by adding the difference to the newer system clock is less than or equal to a last updated first virtual clock, the difference is adjusted by subtracting the newer system clock from the last updated first virtual clock and adding a given time period.

12. A non-transitory computer-readable recording medium having a program recorded thereon, the program being for causing a computer to function as an information processing apparatus configured to perform operations comprising:
updating a first virtual clock on the basis of a system clock, and
synchronizing data, by a processor, with another information processing apparatus on the basis of the first virtual clock and a second virtual clock that is updated by the another information processing apparatus,
wherein the first virtual clock is updated by adding a difference of the first virtual clock based on the system clock to a newer system clock, and
wherein, in an event a result obtained by adding the difference to the newer system clock is less than or equal to a last updated first virtual clock, the difference is adjusted by subtracting the newer system clock from the last updated first virtual clock and adding a given time period.

* * * * *